(12) United States Patent
Baungaard et al.

(10) Patent No.: US 12,727,606 B2
(45) Date of Patent: Sep. 8, 2026

(54) ICE CREAM EXTRUSION SYSTEM

(71) Applicant: Tetra Laval Holdings & Finance S.A., Pully (CH)

(72) Inventors: Elsebeth Baungaard, Skanderborg (DK); Anders Stougaard Baek, Aarhus C (DK)

(73) Assignee: Tetra Laval Holding & Finance S.A., Pully (CH)

( * ) Notice: Subject to any disclaimer, the term of this patent is extended or adjusted under 35 U.S.C. 154(b) by 361 days.

(21) Appl. No.: 18/551,885

(22) PCT Filed: Mar. 23, 2022

(86) PCT No.: PCT/EP2022/057687
§ 371 (c)(1),
(2) Date: Sep. 22, 2023

(87) PCT Pub. No.: WO2022/200464
PCT Pub. Date: Sep. 29, 2022

(65) Prior Publication Data

US 2024/0172772 A1 May 30, 2024

(30) Foreign Application Priority Data

Mar. 25, 2021 (EP) .................................... 21164987

(51) Int. Cl.
*A23G 9/28* (2006.01)

(52) U.S. Cl.
CPC ............. *A23G 9/282* (2013.01); *A23G 9/285* (2013.01)

(58) Field of Classification Search
CPC ........ A23G 9/282; A23G 9/285; A23G 9/281; A23G 9/283; A23G 9/28; B65B 2220/14
(Continued)

(56) References Cited

U.S. PATENT DOCUMENTS 1,384,601 A * 7/1921 Costello, Jr. ......... A21C 15/002 425/463
2,147,686 A * 2/1939 Bagby ..................... B65B 39/00 222/129
(Continued)

FOREIGN PATENT DOCUMENTS

CA 1290974 C 10/1991
GB 773404 A 4/1957
(Continued)

OTHER PUBLICATIONS

Extended European Search Report dated Sep. 14, 2021, for European Patent Application No. 21164987.6.
(Continued)

*Primary Examiner* — Charles P. Cheyney
(74) *Attorney, Agent, or Firm* — Lawrence S. Drasner

(57) ABSTRACT

An ice cream extrusion system comprising a manifold unit and a nozzle unit, the manifold unit comprising two manifolds having a respective inlet that branches into a respective set of flow paths, and a manifold interface to which all flow paths lead, the manifold interface comprising outlets for all the flow paths, where each flow path has an individual outlet in the manifold interface, the nozzle unit comprising a nozzle interface having inlets that are aligned with the outlets of the manifold interface, and a set of nozzle flow paths leading from the inlets of the nozzle interface, wherein all nozzle flow paths converge into a single and common nozzle flow path that forms an extrusion nozzle.

12 Claims, 9 Drawing Sheets

(58) Field of Classification Search
USPC ............................................ 222/145.3, 135
See application file for complete search history.

(56) References Cited

U.S. PATENT DOCUMENTS 2,667,846 A * 2/1954 Grumbly .................. A23G 9/48 137/637.1
2,850,990 A * 9/1958 Rasmusson ............ A23G 3/203 425/134
3,052,381 A * 9/1962 Carpigiani ............. A23G 9/281 222/144.5
3,070,933 A * 1/1963 Carter ..................... B65B 43/50 141/141
3,196,809 A 7/1965 Nelson et al.
3,344,751 A * 10/1967 Cammack ............ A23G 3/0247 425/512
3,347,287 A * 10/1967 Geber .................... A23G 9/282 141/105
3,385,234 A * 5/1968 Anderson ................ A23G 9/00 53/208
3,427,999 A * 2/1969 Schultz .................. A23G 9/285 141/105
3,724,984 A * 4/1973 Jernigan ................ A23G 9/285 141/105
3,840,311 A * 10/1974 Wight .................... A23G 9/285 99/450.2
4,378,164 A * 3/1983 Manfroni .............. A23G 9/281 366/177.1
6,223,949 B1 * 5/2001 Spencer ............... A23G 3/2015 137/637.4
2001/0031303 A1 * 10/2001 Buter ..................... A23G 9/285 425/381.2
2009/0039104 A1 * 2/2009 Genewick ................. B65B 3/04 222/144.5
2014/0242243 A1 8/2014 Petre
2019/0261645 A1 8/2019 McHugh et al.

FOREIGN PATENT DOCUMENTS

GB 1197829 A 7/1970
WO 9402027 A1 2/1994

OTHER PUBLICATIONS

International Search Report dated Jul. 19, 2022, for International Patent Application No. PCT/EP2022/057687.

* cited by examiner

ICE CREAM EXTRUSION SYSTEM

TECHNICAL FIELD

The invention generally relates to ice cream production. More particularly, it is related to an ice cream extrusion system, a replacement nozzle unit and an ice cream production system.

BACKGROUND ART

Today it is commonly known to produce ice cream products by using so-called extrusion. The general principle of extrusion is that ice cream mass is pushed through a nozzle such that the mass is formed in accordance with a shape of the nozzle. The shape may for example be an elliptical shape. After a contour of the ice cream mass is shaped, sticks may be pushed into that ice shaped cream mass using so-called stick inserters. Before or after having the sticks introduced, the ice cream mass can be cut such that individual pieces of the ice cream mass are formed, each piece provided with a stick. Next, the individual pieces may be dipped in chocolate and fed through a freezing tunnel such that ice cream products are formed. Thereafter, before being shipped, the ice cream products may be wrapped in packaging material and placed in secondary packages.

For some ice cream products, two ice cream masses are combined such that two-coloured ice cream products can be produced. For instance, vanilla ice cream mass and strawberry ice cream mass may be combined such that ice cream products with first sections containing vanilla ice cream and second sections containing strawberry ice cream are formed. In addition to providing two colours and/or two different flavours, the first and second sections provide additional possibilities for customizing the ice cream products. For instance, by using two ice cream masses with different colours in combination with the shape provided by the extrusion, the ice cream products may be made to look like a clown, a ladybug etc. Also, the nutritional composition becomes slightly different and may be adjusted by using two or more ice cream masses in different amounts in the final product.

Even though there are extrusion systems today that are combining two or more different ice cream masses such that, for instance, ice cream products comprising both vanilla sections and strawberry sections can be produced, these systems have the disadvantage that these are built for producing one particular ice cream product. As an effect, changing from producing one type of two-coloured (and/or two-flavoured) ice cream product to another requires a substantial cost for an ice cream producer in terms of both money and time. Due to that producing a new type of two-coloured ice cream product today requires a substantial rebuild of existing equipment, relatively few different types of two-coloured ice cream products are produced today.

For the reasons provided above, there is a request from ice cream producers for flexible extrusion systems capable of handling two or more ice cream masses that are combined to form individual pieces of ice cream.

SUMMARY

It is an object of the invention to at least partly overcome one or more of the above-identified limitations of the prior art. In particular, it is an object to provide an ice cream extrusion system with improved flexibility. It is also desirable to provide for reducing the cost of producing one type of multi-ice cream mass based ice cream product to another similar but still different type of product.

According to a first aspect it is provided an ice cream extrusion system comprising a manifold unit and a nozzle unit. The manifold unit comprises a first manifold having an inlet that branches into a first set of flow paths, and a first set of valves arranged to control a flow of a first ice cream mass through each flow path of the first set of flow paths, a second manifold having an inlet that branches into a second set of flow paths, and a second set of valves arranged to control a flow of a second ice cream mass through each flow path of the second set of flow paths, and a manifold interface to which all flow paths of the first and second set of flow paths lead, wherein the manifold interface comprises outlets for all the flow paths of the first and second set of flow paths, where each flow path has an individual outlet in the manifold interface. The nozzle unit comprises a nozzle interface having inlets that are aligned with the outlets of the manifold interface, where each inlet of the inlets is arranged to receive ice cream mass from one aligned outlet of the outlets of the manifold interface, and a set of nozzle flow paths leading from the inlets of the nozzle interface, where each nozzle flow path of the set of nozzle flow paths leads from an individual inlet in the nozzle interface, wherein all nozzle flow paths converge into a single and common nozzle flow path that forms an extrusion nozzle.

An advantage with having the ice cream extrusion system comprising two parts, the manifold unit and the nozzle unit, is that the switching cost between different types of multi-coloured and/or multi-flavoured ice cream products can be reduced. The manifold unit can namely be the same for different ice cream products while only the nozzle unit is ice cream product specific. The manifold interface and the nozzle interface provide for that switching between different manifold units can be made reliably and time efficient.

The manifold interface may be a unitary structure that comprises the outlets of the manifold interface, and the nozzle interface may be a unitary structure that comprises the inlets of the nozzle interface. The unitary structure of the manifold interface may comprise all outlets of the manifold interface. The unitary structure of the nozzle interface may comprise all inlets of the nozzle interface. In some embodiments the nozzle unit has additional inlets for ice cream mass. An advantage of this is that there is one connection node between the manifold unit and the nozzle unit, which reduces a risk of error compared to a system comprising multiple interfaces.

The manifold interface may have a surface that surrounds the outlets of the manifold interface, the nozzle interface may have a surface that surrounds the inlets of the nozzle interface, said surfaces of the manifold interface and the nozzle interface abut each other and are complementary in shape. An advantage of having complementary shapes of the surface of the manifold unit and the surface of the nozzle unit is that an operator can easily mount the ice cream extrusion system and the risk of errors can be reduced.

Each of the manifold unit and the nozzle unit may comprise a respective flange for connecting the units to each other, the ice cream extrusion system comprising a clamp band or bolts arranged to interact with the flanges for connecting the manifold unit to the nozzle unit.

The ice cream extrusion system may further comprise a support structure to which at least one of the manifold unit or the nozzle unit is attached, the support structure comprising a ring that surrounds a periphery of at least one of the manifold unit or the nozzle unit.

The manifold unit may be attached to the ring by a first clamp, and the nozzle unit may be attached to the ring by a second clamp.

A condensation collector may be arranged around a periphery of the nozzle unit for collecting water that is formed by condensation on an outer surface of the nozzle unit. An advantage of this is that condensed water is hindered from reaching the extruded ice cream mass, and thereby negatively affect the ice cream production.

Each of the manifold unit and the nozzle unit may be made of a plastic material.

The ice cream extrusion system may comprise an edge protection that is made of metal and arranged around the peripheral end of the extrusion nozzle. An advantage with this is that a risk that plastic pieces are cut off from the nozzle unit when the extruded ice cream mass is cut into pieces by a cutting apparats can be reduced, thereby the risk that plastic pieces end up in the ice cream products can be reduced.

The nozzle unit may comprise a further inlet at the side of the nozzle unit, the further inlet being arranged to receive a further ice cream mass, and a further flow path that leads from the further inlet and converges with the other flow paths of the nozzle unit, into the single and common nozzle flow path that forms the extrusion nozzle. An advantage with this is that a number of different ice cream masses is not limited to a number of inlets provided in the manifold unit.

According to a second aspect it is provided a replacement nozzle unit configured to replace the nozzle unit of the ice cream extrusion system according to the first aspect, the replacement nozzle unit comprising a nozzle interface having inlets that are aligned with the outlets of the manifold interface, where each inlet of the inlets is arranged to receive ice cream mass from one aligned outlet of the manifold interface, and a set of nozzle flow paths leading from the inlets of the nozzle interface, where each nozzle flow path of the set of nozzle flow paths leads from an individual inlet in the nozzle interface, wherein all nozzle flow paths converge into a single and common nozzle flow path that forms an extrusion nozzle, wherein the nozzle flow paths of the replacement nozzle unit converges into the single nozzle flow path in a different way than that of the nozzle flow paths of the nozzle unit of the ice cream extrusion system.

An advantage of having a replacement nozzle unit is that a different type of ice cream product can be produced by switching from the nozzle unit to the replacement unit.

According to a third aspect it is provided an ice cream production system comprising an ice cream extrusion system according to the first aspect, a first ice cream freezer arranged to feed a first ice cream mass to the ice cream extrusion system, a second ice cream freezer arranged to feed a second ice cream mass to the ice cream extrusion system, a cutting apparatus arranged to cut ice cream mass that is extruded by the ice cream extrusion system into individual pieces, a freezing apparatus arranged to receive the individual pieces, and a packaging machine arranged to wrap package material around each individual piece, such that wrapped ice cream products are formed.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figures 1A, 1B:
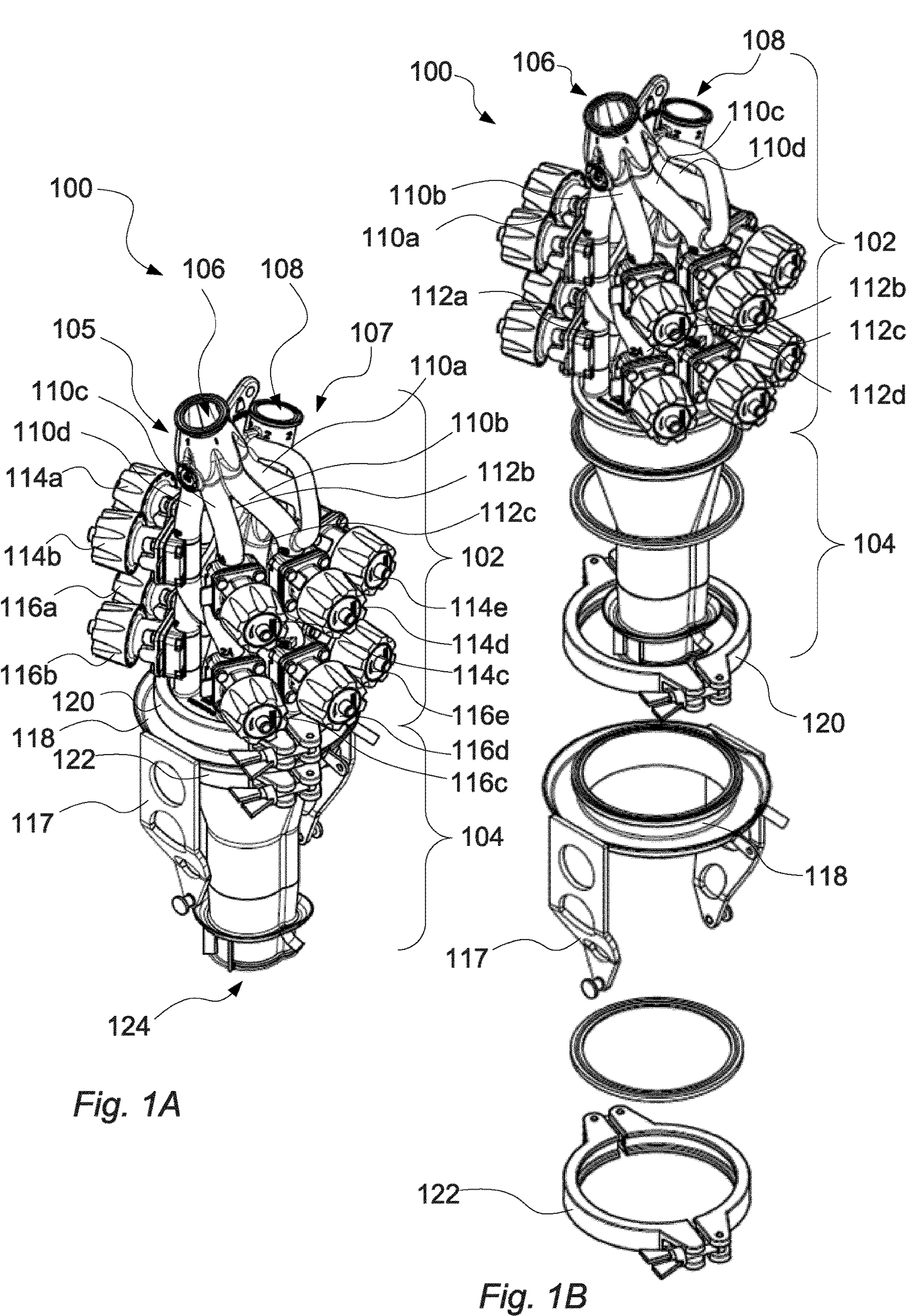
FIG. 1A illustrates an ice cream extrusion system having a manifold unit and a nozzle unit.
FIG. 1B is an exploded view of the ice cream extrusion system.

With reference to FIGS. 1A and 1B an ice cream extrusion system 100 is illustrated by way of example. FIG. 1A illustrates the extrusion system in a mounted state while FIG. 1B illustrates an exploded view of the extrusion system 100.

The ice cream extrusion system 100 comprises two parts; a manifold unit 102 and a nozzle unit 104. In the example illustrated in FIG. 1, two ice cream masses can be fed into the manifold unit 102. A first manifold 105 provided with an inlet 106 is arranged to receive a first ice cream mass, and a second manifold 107 with an inlet 108 is arranged to receive a second ice cream mass. The two ice cream masses may be different in e.g. flavour, nutritional composition and/or in colour.

The ice cream mass received via the inlet 106 of the first manifold 105 is divided into a number of first flow paths 110*a-d*. As illustrated in FIGS. 1A and 1B, this may be achieved by that a pipe forming the inlet 106 is divided (diverges) into a number of pipe sections. In a similar manner, the second ice cream mass received via the inlet 108 of the second manifold 107 can be divided into a number of second flow paths 112*a-d*. In the illustrated example each of the manifolds has 6 flow paths.

To control flows of first ice cream mass in the first pipe sections, a first set of valves 114*a-e* may be mounted on the first pipe sections. As illustrated, the first set of valves 114*a-e* may be manually controlled valves, but it is also possibly to use automatically controlled valves. In a similar manner, to control flows of the second ice cream mass in the second pipe sections, a second set of valves 116*a-e* may be mounted on the second pipe sections. As for the first control valves 114*a-e*, the second control valves 116*a-e* can be manually or automatically controlled.

The manifold unit 102 and the nozzle unit 104 can be attached together with a support structure 117. The support structure 117 may be attached to a supporting structure of a conveyor band, above the conveyor band, or to another piece of equipment, either directly or indirectly, such that the extrusion system 100 is held in place and allowing extruded ice cream mass fed out from the nozzle unit 104 to be received reliably by equipment placed downstream.

The support structure 117 may comprise a ring 118 made to surround the manifold unit 102 and/or the nozzle unit 104 in the mounted state as illustrated in FIG. 1A. The manifold unit 102, the nozzle unit 104 and the support structure 117 can be attached together by using a first clamp 120 placed above the ring 118 of the support structure 117 and a second clamp 122 placed below the ring 118.

After the first and second ice cream masses have been divided in the manifold unit 102, these are transferred held apart by the manifold unit 102, to the nozzle unit 104. In the nozzle unit 104, a set of nozzle flow paths receive the ice cream mass from the manifold unit 102, which converge such that a combined ice cream mass with first sections comprising the first ice cream mass and second sections comprising the second ice cream mass can be extruded from a nozzle outlet 124 of the nozzle unit 104.

By having a two-part approach as suggested herein, that is, the manifold unit 102 and the nozzle unit 104 as two separate parts, it is possible to use one and the same manifold unit 102 for a large variety of multi-coloured and/or multi-flavoured ice cream products with different contours, i.e. form of the nozzle outlet 124. Also, since the flow of ice cream mass can be individually controlled in each of the flow paths, by regulating the valves accordingly, a more homogenous ice cream product with the desired form and shape may be obtained.

The nozzle unit 104 and the manifold unit 102 may be made in plastic material. The nozzle unit 104 and the manifold unit 102 may be 3D-printed using conventional 3D-printing techniques.

Figures 2A, 2B, 2C, 2D:
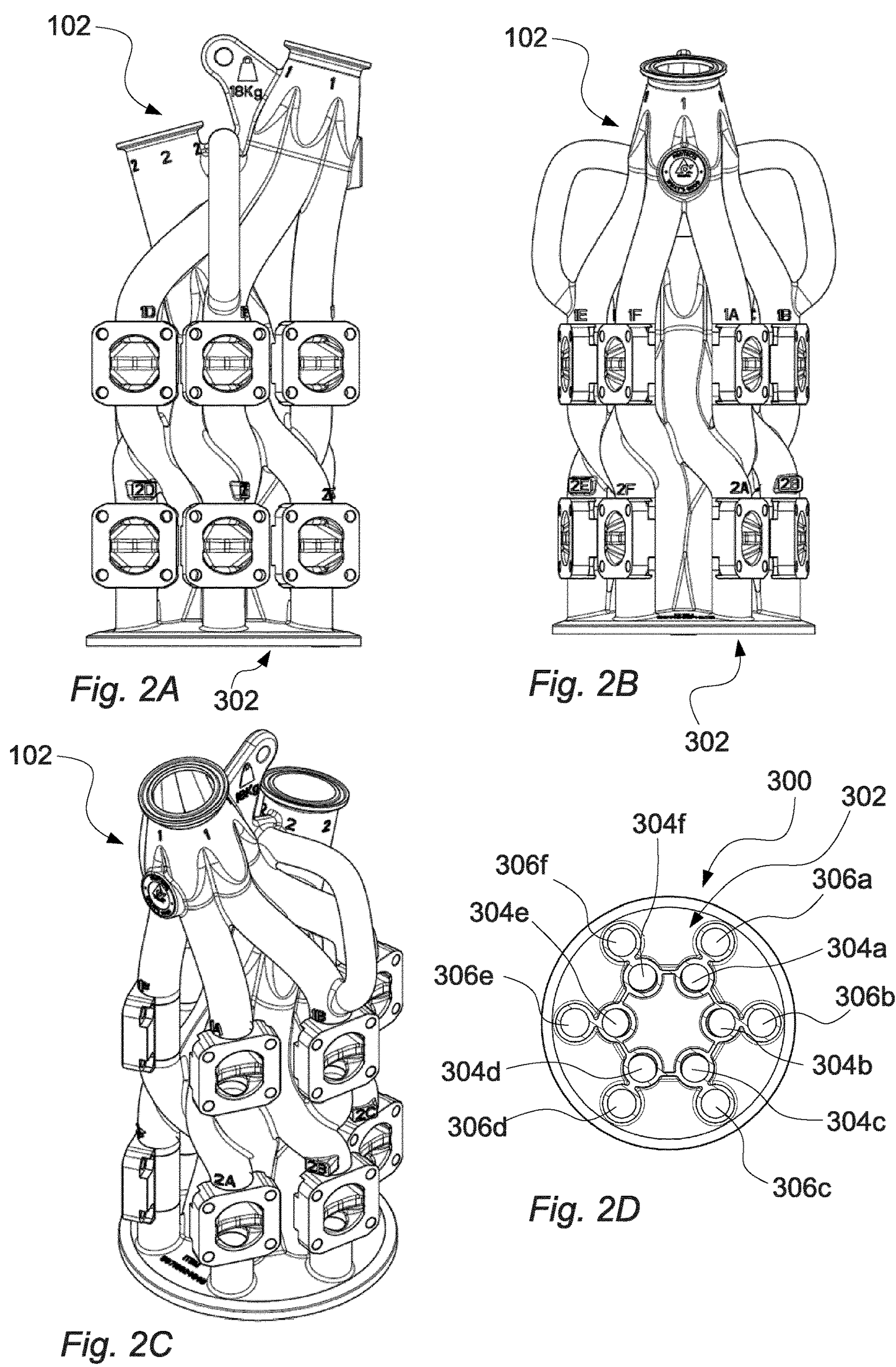
FIG. 2A-D illustrate the manifold unit of the ice cream extrusion system.

FIG. 2A-D illustrate the manifold unit 102 in further detail by way of example, without the valves being shown. FIGS. 2A and 2B illustrate the manifold unit 102 from two different side views, while FIG. 2C is a perspective view. FIG. 2D illustrates a bottom view of the manifold unit 102.

As illustrated in FIG. 2D, a manifold interface 300 can be provided in a bottom of the manifold unit 102. The manifold interface 300 is aligned with a nozzle interface, illustrated in FIG. 4A, such that the first and second ice cream masses can be transferred from the manifold unit 102 to the nozzle unit 104. The nozzle interface 300 can comprise a manifold surface 302, first outlets 304*a-f* and second outlets 306*a-f*. The first outlets 304*a-f* may be outlets of the first flow paths 110*a-e* illustrated in FIGS. 1A and B, and the second outlets 306*a-e* may be outlets of the second flow paths 112*a-d* also illustrated in FIGS. 1A and B. The first and second outlets 304*a-f*, 306*a-f* may be arranged in different patterns. Each of the flow paths of the manifold unit 102 ends in the manifold interface 300, such that the flow path ends thereby form the outlets in the manifold interface 300.

An example, as illustrated in FIG. 2D, is to have the first outlets 304*a-f* placed radially inwards the second outlets 306*a-f*. This set-up is advantageous when having the first set of valves 114*a-e* placed above the second set of valves 116*a-e*. After the first flow paths have passed the first set of valves 114*a-e* it is namely possible to steer the first flow paths radially inwards such that the first flow paths are placed radially inwards the second flow paths. By having the second flow paths 112*a-d* placed outside the first flow paths 110*a-d*, the second set of valves 116*a-e* can be easily attached.

Even though the manifold interface 300 is referred to as bottom herein, it should be understood that having the manifold unit 102 placed vertically above the nozzle unit 104 is one out of many alternatives. In the illustrated example the manifold surface 302 is flat. However, it may be curved such as concave or convex, or may have a stepped shape where parts of the manifold surface 302 are on different levels.

Figure 3:
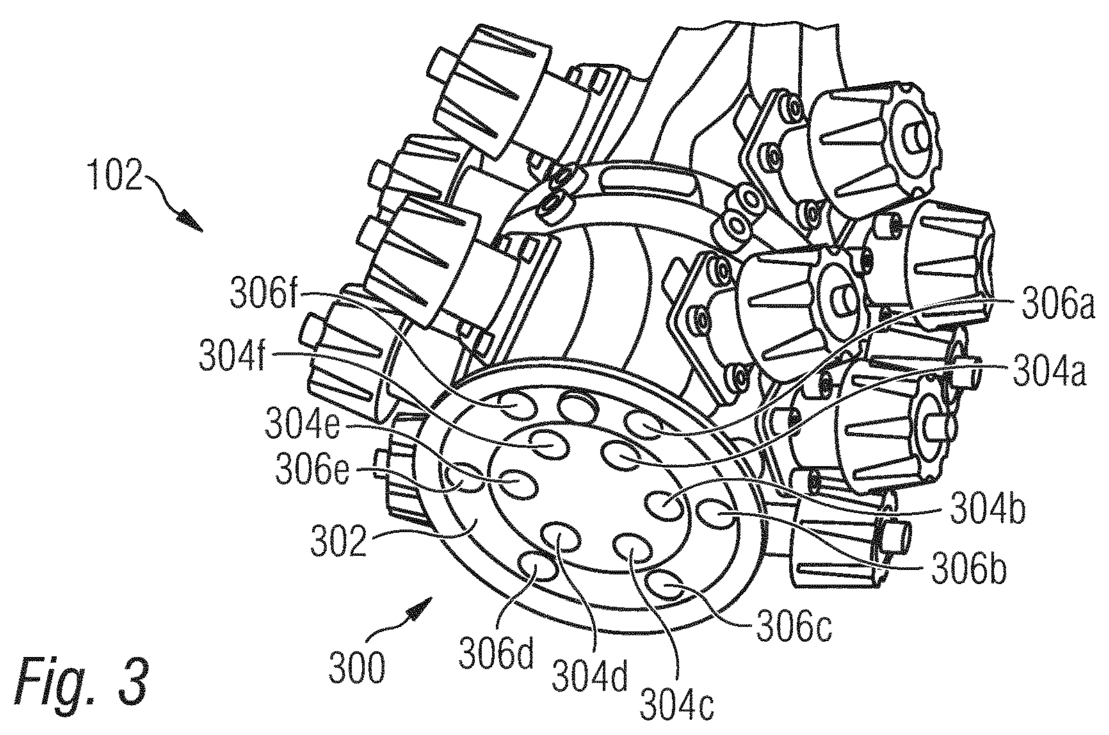
FIG. 3 is a perspective view from below of the manifold unit.

FIG. 3 illustrates a perspective view from below of the manifold unit 102 according to another example. The example illustrated in FIG. 3 has six first flow paths and correspondingly six first outlets 304*a-f*, and also six second flow paths and correspondingly six second outlets 306*a-f*.

Figure 4A:
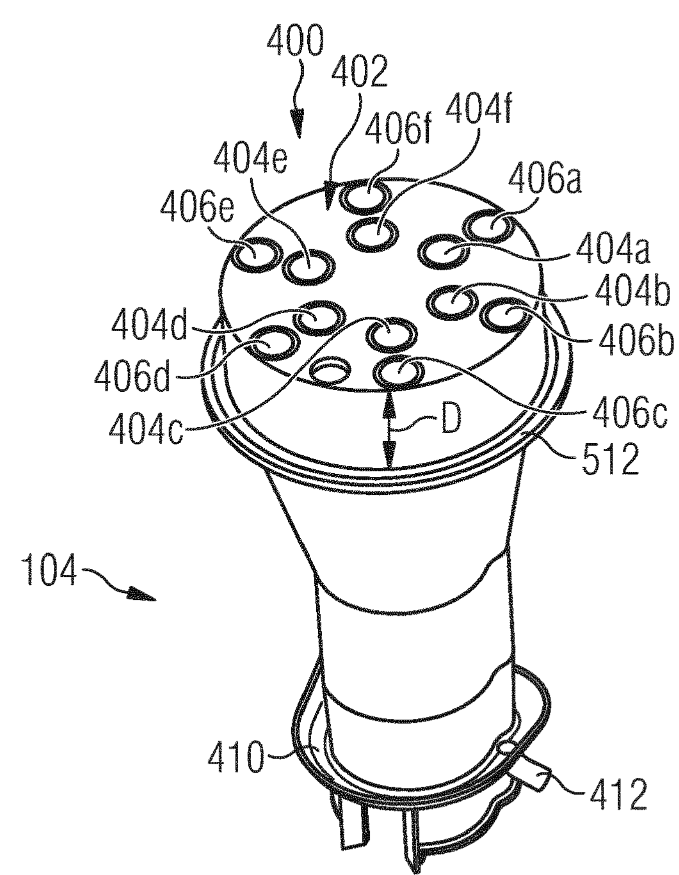
FIG. 4A is a perspective view of the nozzle unit.

FIG. 4A illustrates a perspective view of the nozzle unit 104 in further detail by way of example. A nozzle interface 400 is provided. This is made to interact with the manifold interface 300 such that the first and second flow paths 110*a-f*, 112*a-f* can extend from the manifold unit 102 to the nozzle unit 104 to convey the ice cream mass into the nozzle unit 104. To achieve this, first and second inlets 404*a-f*, 406*a-f* are placed in the nozzle interface 400 such that, in the mounted state, the first outlets 304*a-f* of the manifold interface 300 are aligned with the first inlets 404*a-f* of the nozzle interface 400, and the second outlets 306*a-f* of the manifold interface 300 are aligned with the second inlets 406*a-f* of the nozzle interface 400.

In addition to the first and second inlets 404*a-f*, 406*a-f*, the nozzle interface 400 comprises a surface 402. To provide for that the manifold unit 102 and the nozzle unit 102 are aligned properly in the mounted state, the surface 302 of the manifold interface 300 may comprise features facilitating proper fitting with the surface 402 of the nozzle interface 400. For instance, the surface 302 of the manifold interface 300 may comprise a protrusion and the surface 402 of the nozzle interface 400 may comprise a recess for receiving the protrusion. Alternatively or in combination, as mentioned the surface 302 of the manifold interface 300 may be convex and the surface 402 of the nozzle interface 400 may be concave. In general words, the surface 302 of the manifold interface 300 and the surface 402 of the nozzle interface 400 can be complementary in shape. The interface surfaces 302, 402 can be made to abut each other so close that no gaskets are needed around the outlets and inlets of the interfaces, while assuring that ice cream does not low out in between the interface surfaces 302, 402.

Figure 9:
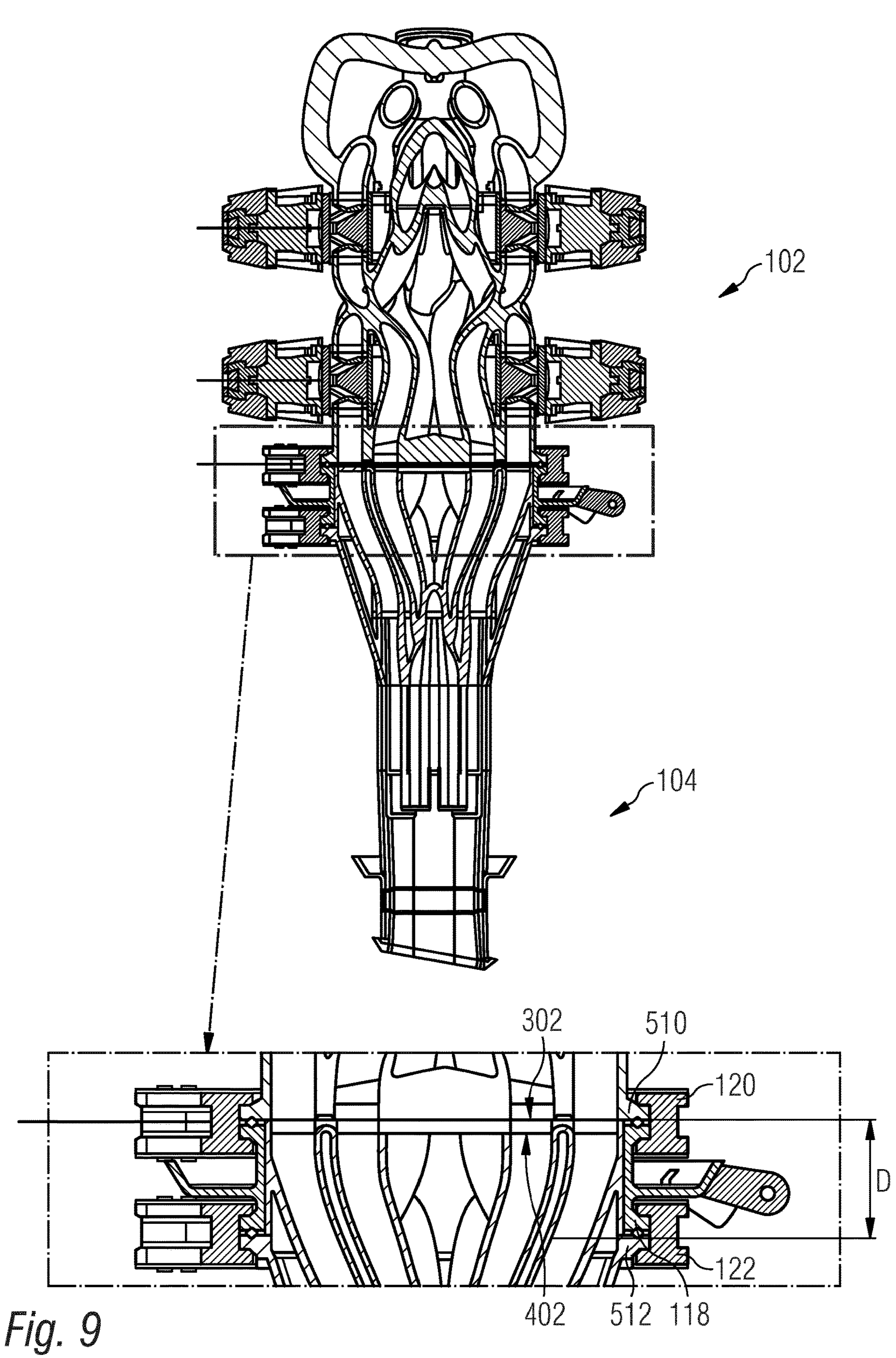
FIG. 9 illustrates in detail how the manifold unit and the nozzle unit are attached to each other.

At a distance D from the surface 402 of the nozzle interface 400, a flange 512 may be provided. A flange 510 (see FIG. 5) can also be provided at a peripheral end of the manifold unit 102. As illustrated in FIG. 9 and further elaborated upon below, the flanges 510, 512 can provide for that the manifold unit 102, the nozzle unit 104 and the support structure 117 can be attached together securely.

To avoid that condensed water formed on an outside of the nozzle unit 102 reach the combined ice cream mass extruded from the nozzle unit 102, a condensation collector 410 may be arranged above a peripheral end of the nozzle unit 104. The condensation collector 410 may be provided with a drainage pipe 412.

Figure 4B:
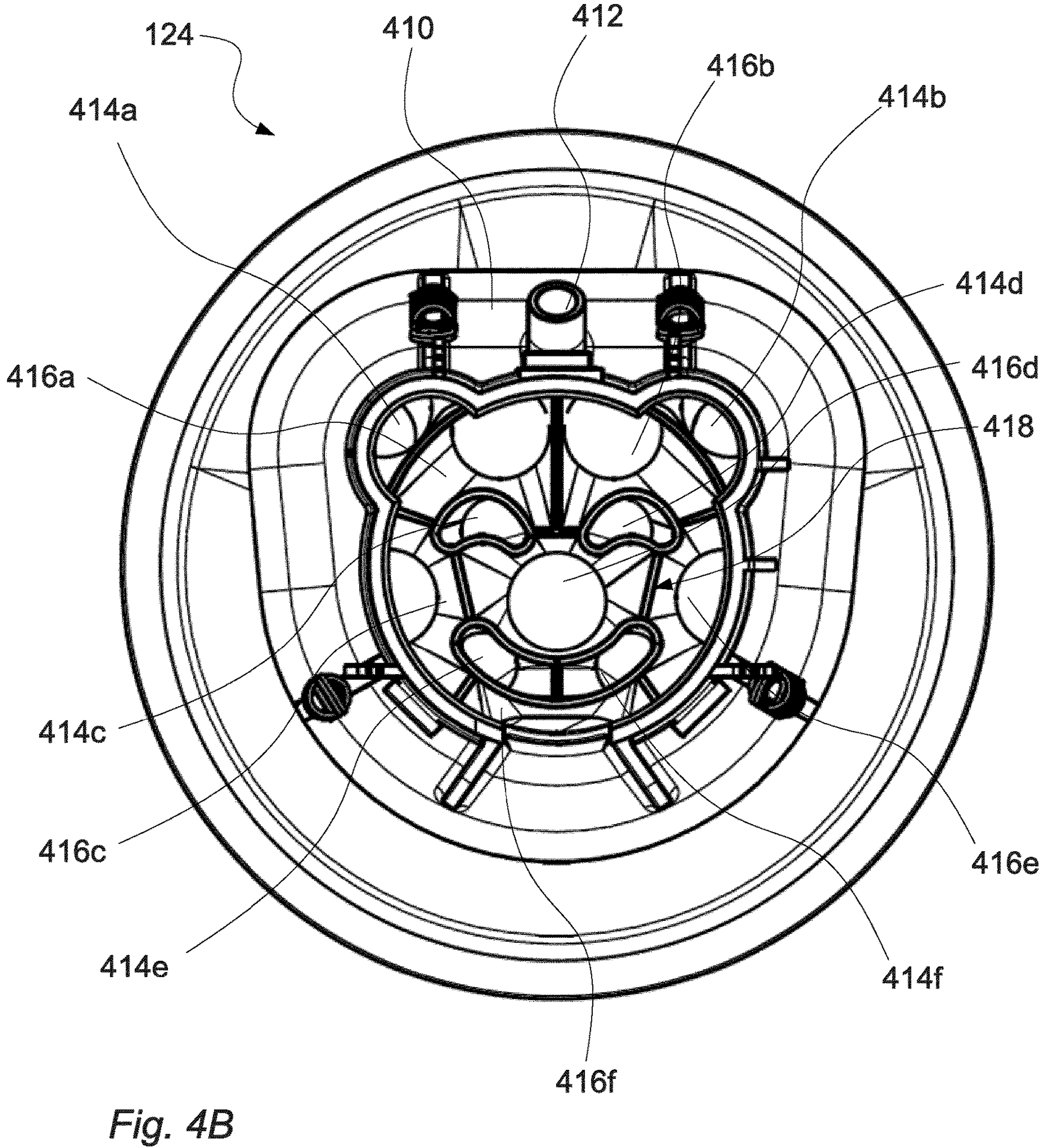
FIG. 4B illustrates the nozzle unit as seen from below.

FIG. 4B illustrates the nozzle unit 104 seen from below in further detail by way of example. The nozzle outlet 124, which is placed in a bottom end of the ice cream extrusion system 100 when arranged vertically, can be adapted such that different ice cream products can be produced. In this particular example, the ice cream products being produced are formed as teddy bear faces. To provide two-coloured teddy bear face ice cream products, the first flow paths 110*a-d*, which in this particular example may comprise red strawberry ice cream mass, can be directed to the first sections 414*a-f* and the second flow paths 112*a-f*, which in this particular example may comprise white vanilla ice cream mass, can be directed to the second sections 416*a-f*. To keep the first and second sections 414*a-f*, 416*a-f* apart single walls 418 may be provided. Once extruded, the first and second ice cream masses from the first and second sections 414*a-f*, 416*a-f* merge into the combined ice cream mass. The sections 414*a-f* and 416*a-f* are formed by the set of nozzle flow paths 504 (see FIG. 5) that lead from the inlets 404*a-f*, 406*a-f* of the nozzle interface. As mentioned, each nozzle flow path of the set of nozzle flow paths 504 leads from an individual inlet in the nozzle interface 400, and all nozzle flow paths 504 converge into a single and common nozzle flow path 506 (see FIG. 5) that forms an extrusion nozzle 508.

Figure 5:
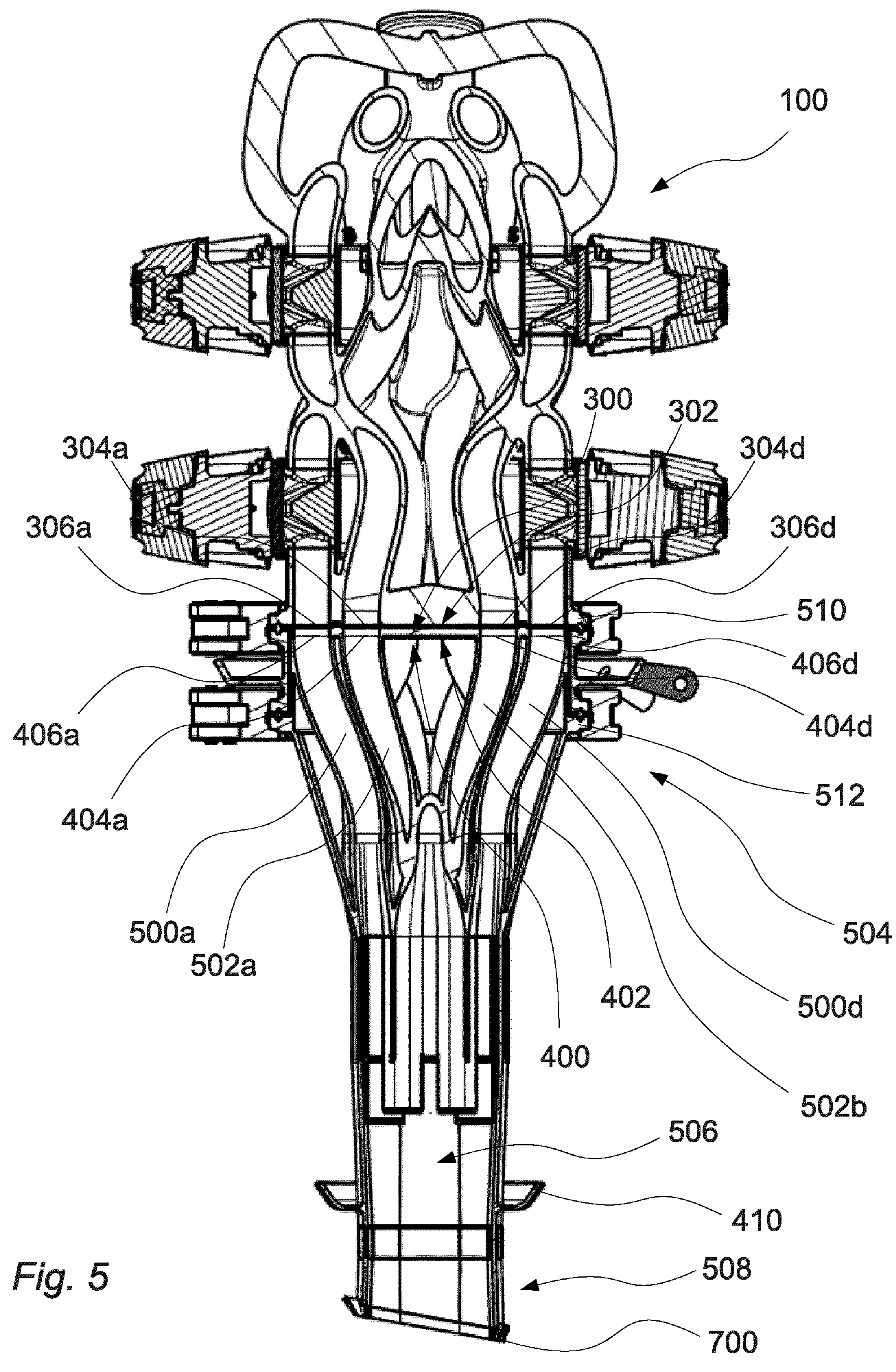
FIG. 5 is a cross-sectional view of the ice cream extrusion system.

FIG. 5 illustrates a cross-sectional view of the ice cream extrusion system 100. As mentioned above, in the mounted state, the surface 302 of the manifold interface 300 abuts the surface 402 of the nozzle interface 400, and the first and second outlets 304*a-f*, 306*a-f* of the manifold interface 300 are aligned with the first and second inlets 404*a-f*, 406*a-f* of the nozzle interface 400.

The first flow paths 110*a-d* of the manifold unit 102 are transformed into first nozzle flow paths 500*a*, 500*d* of the nozzle unit 104, and the second flow paths 112*a-f* of the manifold unit 102 are transformed into second nozzle flow paths 502*a*, 500*d*, wherein the first and second nozzle flow paths 500*a*, 500*d*, 502*a*, 502*d* together form a respective set of nozzle flow paths 504. The ends of all flow paths in the manifold unit 102 can be seen in FIG. 4B, where each flow path end forms a respective section of the sections 414*a-f*, 416*a-f*.

The nozzle flow paths can converge into a single and common nozzle flow path 506 forming an extrusion nozzle 508. As illustrated, by having the single walls 418 not extend up until a peripheral end 700 of the extrusion nozzle 508, the first and second ice cream masses are allowed to merge together in the single and common nozzle flow path 506 before leaving the ice cream extrusion system 100.

Figure 6:
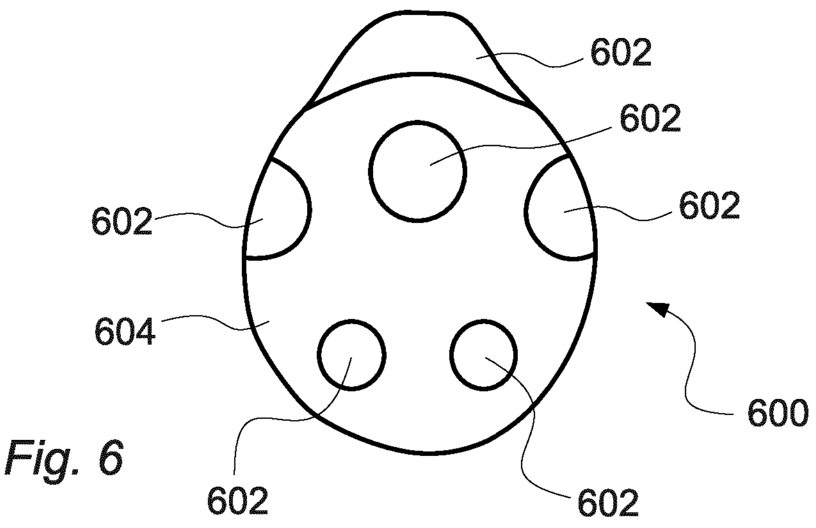
FIG. 6 illustrates an example of how combined ice cream mass may appear after being extruded from the extrusion nozzle.

FIG. 6 illustrates an example of how combined ice cream mass 600 may appear after being fed out from an extrusion nozzle similar to the described nozzle 508, but having another shape of the end sections of the nozzle flow paths 504. In this particular example, the extruded ice cream products are shaped as ladybugs. The first ice cream mass 602 may be black liquorice ice cream mass, and the first sections 414*a-f* may be arranged such that spots and head of the ladybug are formed by the first ice cream mass 602. The second ice cream mass 604 may be red strawberry ice cream mass and the second sections 416*a-f* may be arranged such that the remaining parts of the ladybug are formed by the second ice cream mass 604.

Figure 7:
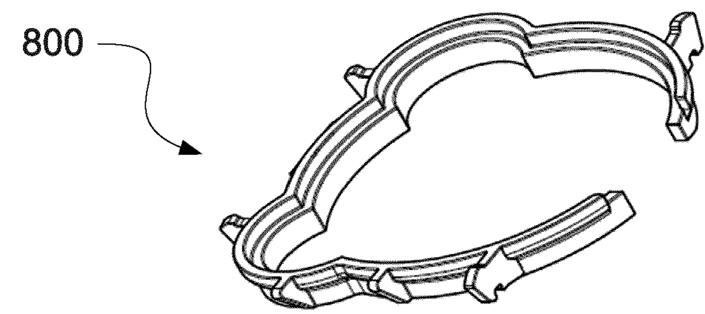
FIG. 7 illustrates an edge protection for a peripheral end of an extrusion nozzle of the ice cream extrusion system.
Figure 8:
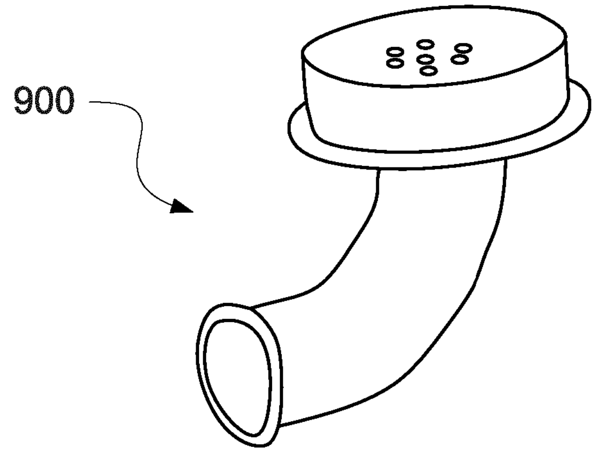
FIG. 8 illustrates a cleaning-in-place (CIP) collector.

A knife may be used for cutting the combined ice cream mass into individual pieces during the extrusion from the nozzle. Then might be is a risk that pieces are cut off from the nozzle unit 104 in case a cutting apparatus is not properly adjusted in height, in particular if the nozzle unit 104 is made of a plastic material. To avoid that pieces are cut off from the nozzle unit 104, an edge protection 800 may be placed on the peripheral end of the extrusion nozzle. FIG. 7 illustrates such edge protection by way of example. The edge protection 800 can be fitted on the nozzle illustrated in FIG. 4B. To withstand the knife, the edge protection 800 may be made of metal. The edge protection may also be produced by using 3D printing.

When cleaning the ice cream extrusion system 100, the manifold unit 102 and the nozzle unit 104 may be demounted. The nozzle unit 104 may thereafter be removed and cleaned separately. To clean the manifold unit 102 and other pieces of equipment connected to the manifold unit 102, a cleaning-in-place (CIP) program may be used. To form a closed loop in which water and cleaning agent may run during the CIP program, a CIP collector 900, as illustrated in FIG. 9 by way of example, may be attached to the manifold unit 102 in a similar manner as the nozzle unit 104. The surface of the CIP collector 900 facing the manifold interface 300 may be concave while the surface 302 of the manifold interface 300 may be plane. This creates an interspace between the manifold interface surface 302 and the CIP collector 900, which improves cleaning. Even though not illustrated, the CIP collector 900 is typically connected to e.g. a hose for returning the cleaning liquid to the inlets of the manifold unit 102, such that the closed loop is formed.

FIG. 9 illustrates the attachment of the manifold unit 102, the nozzle unit 104 and the ring 118 of the support structure 117 in further detail. As illustrated, as an effect of that the flange 512 of the nozzle unit 104 is placed at the distance D from the surface 402 of the nozzle interface 400, the ring 118 may be held between the flange 510 of the manifold unit 102 and the flange 512 of the nozzle unit 104. Due to that the ring 118 is provided with an upper flange and a lower flange, the first clamp 120 may be placed over the flange 510 of the manifold unit 102 and the upper flange of the ring 118 such that these can be clamped together. Similarly, by placing the second clamp 122 over the lower flange of the ring 118 and the flange 512 of the nozzle unit 104, these two can be clamped together.

Figure 10:
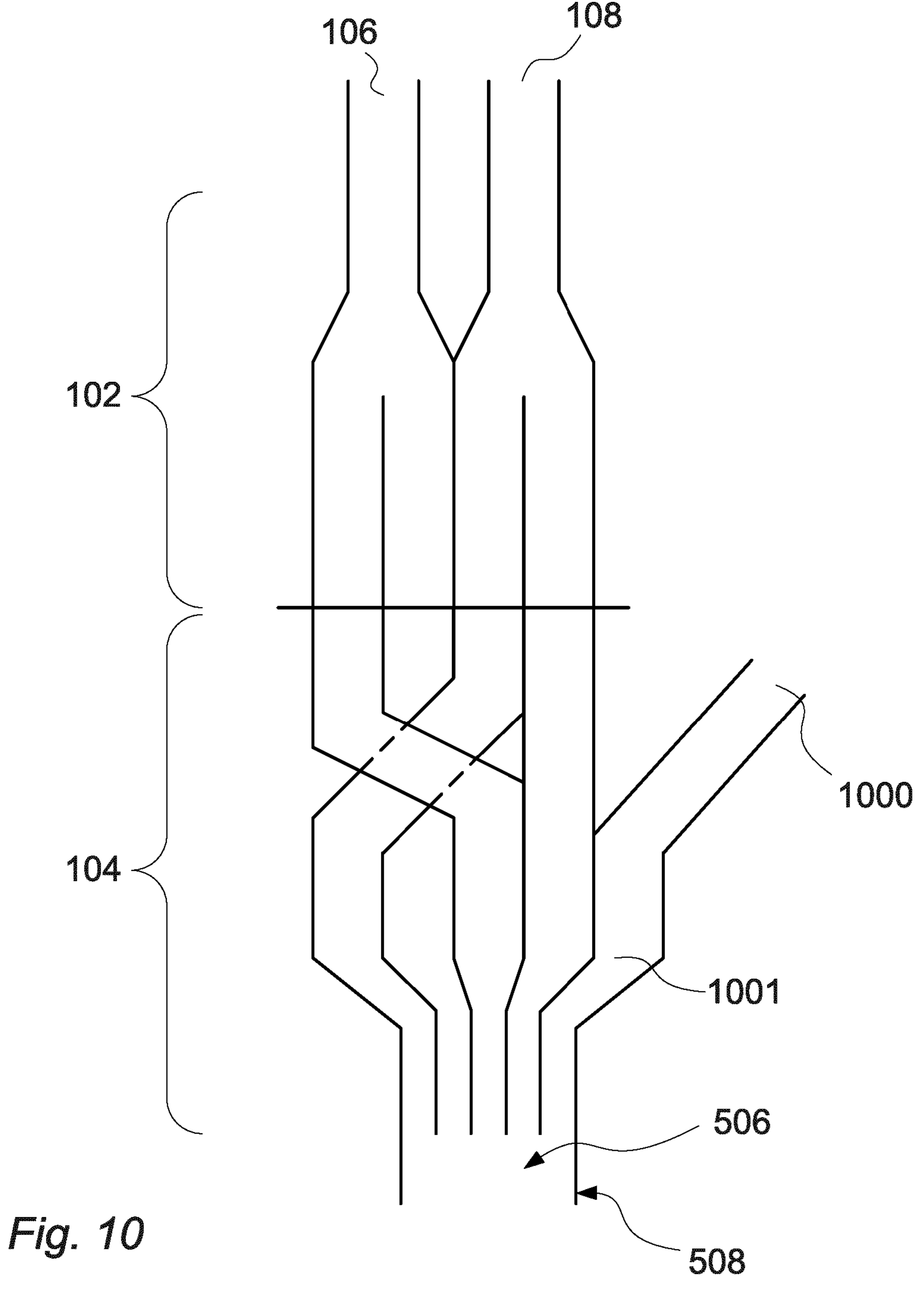
FIG. 10 is schematic view of a nozzle unit provided with a further inlet.

FIG. 10 illustrates generally how a third ice cream mass, or more generally a further ice cream mass, may be included in the combined ice cream mass even though the manifold unit 102 is arranged to receive only two ice cream masses.

As illustrated, two ice cream masses can be received by the manifold unit 102 and transferred into the nozzle unit 104. In the nozzle unit 104 the ice cream masses can be directed such that the combined ice cream mass with first sections comprising the first ice cream mass and second sections comprising the second ice cream mass can be fed into the single and common nozzle flow path 506 and extruded from the extrusion nozzle 508.

However, the nozzle unit 104 may also be provided with a further inlet 1000 arranged to receive a further ice cream mass, in this particular example a third ice cream mass. As illustrated, via a further flow path 1001, the further ice cream mass can converge with the first and second ice cream masses into the combined ice cream mass.

Even though illustrated and exemplified with two ice cream masses fed via the manifold unit 102 and one ice cream mass provided directly into the nozzle unit 104, it should be understood that more than two or more ice cream masses can be provided via the manifold unit 102 and also that any number of further inlets may be provided in the nozzle unit 104.

Figure 11:
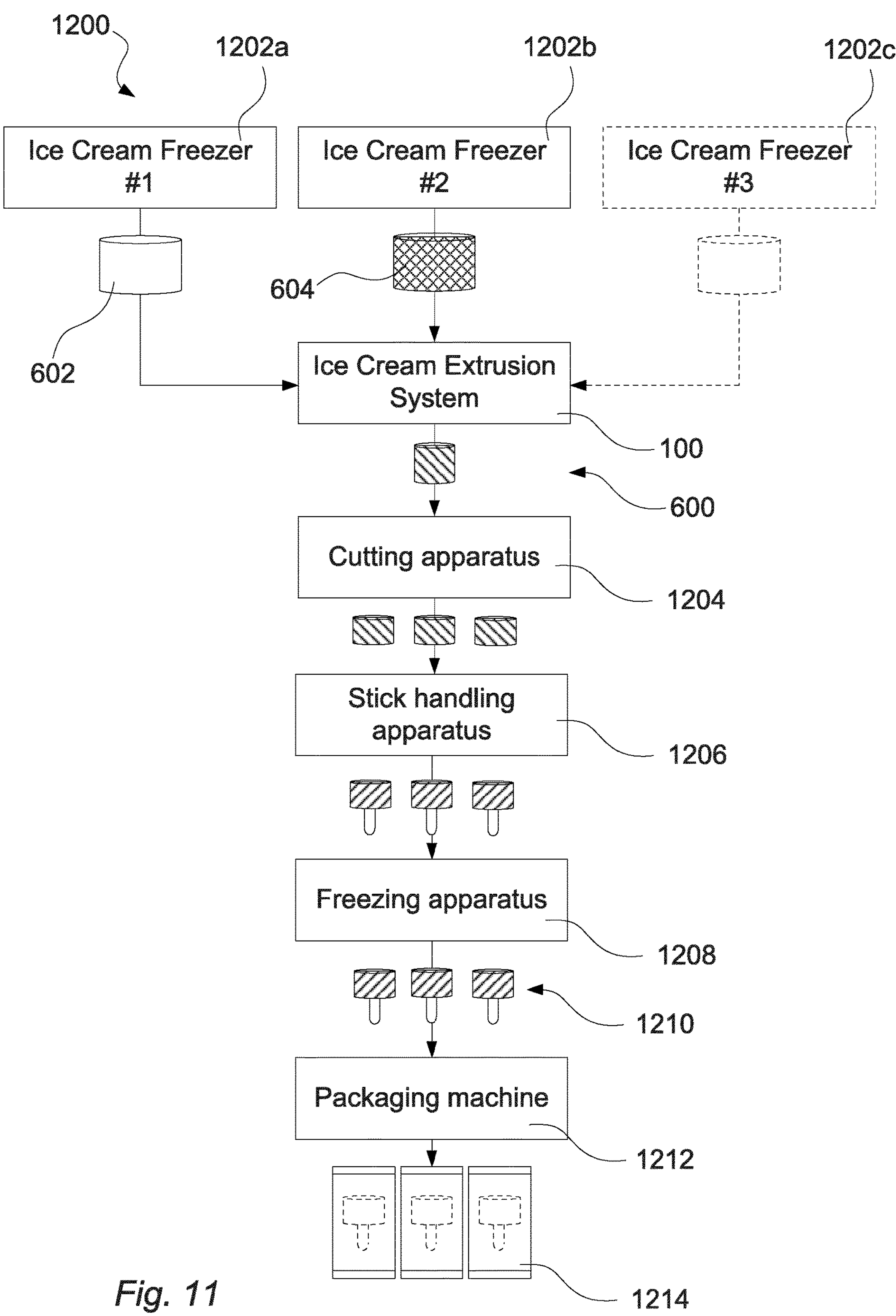
FIG. 11 illustrates an ice cream production system.

FIG. 11 illustrates by way of example an ice cream production system 1200. A first ice cream mass 602 may be produced by a first ice cream freezer 1202*a* and the second ice cream mass 604 may be produced by a second ice cream freezer 1202*b*. Optionally, a third ice cream mass, discussed above with reference to FIG. 10, may be produced by a third ice cream freezer 1202*c*.

The first and second ice cream mass 602, 604 and optionally the third ice cream mass can be transferred into the ice cream extrusion system 100 described above. From the ice cream extrusion system 100, the combined ice cream mass 600 can be provided.

The combined ice cream mass 600 can be cut into individual pieces by a cutting apparatus 1204. The cutting apparatus 1204 may be provided below the extrusion nozzle 508 and the edge protection 800 may be used for avoiding that cut-offs from the extrusion nozzle are at risk ending up in the ice cream products.

After being cut into pieces, or alternatively before being cut into pieces, sticks may be provided in the individual pieces by a stick handling apparatus 1206. Since ice cream products may be provided without sticks, this piece of equipment is optional.

Next, the individual pieces can be transferred through a freezing apparatus 1208 in which the individual pieces are transformed into ice cream products 1210. Downstream the freezing apparatus 1208, the ice cream products 1210 can be wrapped in packaging material by a packaging machine 1212 such that wrapped ice cream products 1214 are formed.

From the description above follows that, although various embodiments of the invention have been described and shown, the invention is not restricted thereto, but may also be embodied in other ways within the scope of the subject-matter defined in the following claims.

The invention claimed is:

1. An ice cream extrusion system comprising a manifold unit and a nozzle unit, the manifold unit comprising:

a first manifold having an inlet that branches into a first set of flow paths, and a first set of valves arranged to control a flow of a first ice cream mass through each flow path of the first set of flow paths;

a second manifold having an inlet that branches into a second set of flow paths, and a second set of valves arranged to control a flow of a second ice cream mass through each flow path of the second set of flow paths, and a manifold interface to which all flow paths of the first and second set of flow paths lead, wherein the manifold interface comprises outlets for all the flow paths of the first and second set of flow paths, where each flow path has an individual outlet in the manifold interface;

the nozzle unit comprising:

a nozzle interface having inlets that are aligned with the outlets of the manifold interface, where each inlet of the inlets is arranged to receive ice cream mass from one aligned outlet of the outlets of the manifold interface;

a set of nozzle flow paths leading from the inlets of the nozzle interface, where each nozzle flow path of the set of nozzle flow paths leads from an individual inlet in the nozzle interface, wherein all nozzle flow paths converge into a single and common nozzle flow path that forms an extrusion nozzle;

wherein the manifold interface comprises a manifold interface surface which includes the outlets arranged to receive flow from the first and second manifolds through the manifold interface and the nozzle interface comprises a nozzle interface surface that includes the inlets, whereby in a mounted state the manifold interface surface and the nozzle interface surface are positioned to align the outlets of the manifold interface with the inlets of the nozzle interface at an abutment of the manifold interface surface and the nozzle interface surface; and wherein the manifold interface surface surrounds the outlets of the manifold interface, the nozzle interface surface surrounds the inlets of the nozzle interface.

2. The ice cream extrusion system according to claim 1, wherein the manifold interface is a unitary structure that comprises the outlets of the manifold interface, and the nozzle interface is a unitary structure that comprises the inlets of the nozzle interface.

3. The ice cream extrusion system according to claim 2, wherein the manifold interface surface and the nozzle interface surface abut each other and are complementary in shape.

4. The ice cream extrusion system according to claim 1, wherein the manifold unit includes a first flange and the nozzle unit includes a second flange for connecting the units to each other, the ice cream extrusion system comprising a clamp band or bolts arranged to interact with the flanges for connecting the manifold unit to the nozzle unit, and wherein the first flange is provided at a peripheral end of the manifold unit and the second flange is provided spaced at a distance from the nozzle interface surface.

5. The ice cream extrusion system according to claim 1, comprising a support structure to which at least one of the manifold unit or the nozzle unit is attached, the support structure comprising a ring that surrounds a periphery of at least one of the manifold unit or the nozzle unit.

6. The ice cream extrusion system according to claim 5, wherein the manifold unit is attached to the ring by a first clamp, and the nozzle unit is attached to the ring by a second clamp.

7. The ice cream extrusion system according to claim 1, wherein a condensation collector is arranged around a periphery of the nozzle unit, for collecting water that is formed by condensation on an outer surface of the nozzle unit.

8. The ice cream extrusion system according to claim 1, wherein each of the manifold unit and the nozzle unit are made of a plastic material.

9. The ice cream extrusion system according to claim 1, comprising an edge protection that is made of metal and arranged around the peripheral end of the extrusion nozzle.

10. The ice cream extrusion system according to claim 1, wherein the nozzle unit comprises a further inlet at the side of the nozzle unit, the further inlet being arranged to receive a further ice cream mass, and a further flow path that leads from the further inlet and converges with the other flow paths of the nozzle unit, into the single and common nozzle flow path that forms the extrusion nozzle.

11. A replacement nozzle unit configured to replace the nozzle unit of the ice cream extrusion system according to claim 1, the replacement nozzle unit comprising a nozzle interface having inlets that are aligned with the outlets of the manifold interface, where each inlet of the inlets is arranged to receive ice cream mass from one aligned outlet of the manifold interface, and a set of nozzle flow paths leading from the inlets of the nozzle interface, where each nozzle flow path of the set of nozzle flow paths leads from an individual inlet in the nozzle interface, wherein all nozzle flow paths converge into a single and common nozzle flow path that forms an extrusion nozzle, wherein the nozzle flow paths of the replacement nozzle unit converges into the single nozzle flow path in a different way than that of the nozzle flow paths of the nozzle unit of the ice cream extrusion system.

12. An ice cream production system comprising an ice cream extrusion system according to claim 1, a first ice cream freezer arranged to feed a first ice cream mass to the ice cream extrusion system, a second ice cream freezer arranged to feed a second ice cream mass to the ice cream extrusion system, a cutting apparatus arranged to cut ice cream mass that is extruded by the ice cream extrusion system into individual pieces, a freezing apparatus arranged to receive the individual pieces, and a packaging machine arranged to wrap package material around each individual piece, such that wrapped ice cream products are formed.

* * * * *